United States Patent
Bialer et al.

(10) Patent No.: US 10,502,827 B2
(45) Date of Patent: Dec. 10, 2019

(54) ADDRESSING INTER-NODE PHASE NOISE IN NON-COHERENT RADAR SYSTEM

(71) Applicant: GM Global Technology Operations LLC, Detroit, MI (US)

(72) Inventors: Oded Bialer, Petah Tivak (IL); Amnon Jonas, Jerusalem (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/976,200

(22) Filed: May 10, 2018

(65) Prior Publication Data

US 2019/0346558 A1 Nov. 14, 2019

(51) Int. Cl.
| | | |
|---|---|---|
| *G01S 13/93* | (2006.01) | |
| *H04B 10/61* | (2013.01) | |
| *G01S 13/42* | (2006.01) | |

(52) U.S. Cl.
CPC ........... *G01S 13/931* (2013.01); *G01S 13/42* (2013.01); *H04B 10/6165* (2013.01); *G01S 2013/9325* (2013.01); *G01S 2013/9375* (2013.01)

(58) Field of Classification Search
CPC ................. G01S 13/931; G01S 13/42; G01S 2013/9325; G01S 2013/9375; H04B 10/6165
See application file for complete search history.

(56) References Cited

U.S. PATENT DOCUMENTS

| | | | | |
|---|---|---|---|---|
| 5,000,566 | A * | 3/1991 | Kuppenheimer, Jr. ... | G01P 5/20 340/974 |
| 8,711,038 | B2 * | 4/2014 | Reede .................... | G01S 5/0289 342/458 |
| 9,733,345 | B2 * | 8/2017 | Zohar ..................... | G01S 11/02 |
| 9,772,397 | B1 * | 9/2017 | Bordes .................... | G01S 7/023 |
| 2008/0074307 | A1 * | 3/2008 | Boric-Lubecke .... | A61B 5/0205 342/28 |
| 2011/0286508 | A1 * | 11/2011 | Smith ............... | H04L 25/03343 375/224 |
| 2015/0309154 | A1 * | 10/2015 | Lohbihler ............... | B25J 13/089 702/158 |
| 2015/0346319 | A1 * | 12/2015 | Wuersch ............... | G01C 15/002 356/623 |
| 2017/0168134 | A1 * | 6/2017 | Jenwatanavet ......... | H04W 4/80 |

* cited by examiner

Primary Examiner — Mohamed Barakat
(74) Attorney, Agent, or Firm — Cantor Colburn LLP

(57) ABSTRACT

A radar system and method of detecting an object involve a first node including a first transmitter and a first receiver, and a second node including a second transmitter and a second receiver. The second receiver receives a first received signal from an object from a first transmission by the first transmitter, the first received signal including first phase noise with a first delay, and the first receiver receives a second received signal from the object from a second transmission by the second transmitter, the second received signal including second phase noise with a second delay. A processor processes the first transmission, the first received signal, the second transmission, and the second received signal to eliminate the inter-node phase noise and to estimate a location of the object relative to the radar system based on the first delay and the second delay.

19 Claims, 5 Drawing Sheets

ADDRESSING INTER-NODE PHASE NOISE IN NON-COHERENT RADAR SYSTEM

INTRODUCTION

The subject disclosure relates to addressing inter-node phase noise in a non-coherent radar system.

Vehicles (e.g., automobiles, trucks, construction equipment, farm equipment, automated factory equipment) are increasingly outfitted with sensors that provide information to augment or automate vehicle operation. Exemplary sensors include radio detection and ranging (radar) systems, cameras, microphones, and light detection and ranging (lidar) systems. The radar system in a vehicle may include more than one transmitter and receiver pair, referred to as a node, to perform detection and monitoring from different locations of the vehicle, for example. In this case, using a common reference clock for all the nodes may be impractical, because attenuation and phase noise increase proportionally with the distance over which a high frequency signal (e.g., in the gigahertz range) is distributed. Accordingly, it is desirable to address inter-node phase noise in a non-coherent radar system.

SUMMARY

In one exemplary embodiment, a radar system includes a first node including a first transmitter and a first receiver, and a second node, spaced apart from the first node, including a second transmitter and a second receiver. The second receiver receives a first received signal from an object resulting from reflection of a first transmission by the first transmitter, the first received signal including first phase noise, which is associated with the first transmitter, with a first delay, and the first receiver receives a second received signal from the object resulting from reflection of a second transmission by the second transmitter, the second received signal including second phase noise, which is associated with the second transmitter, with a second delay. A processor addresses inter-node phase noise represented by the first phase noise and the second phase noise by processing the first transmission, the first received signal, the second transmission, and the second received signal to eliminate the inter-node phase noise and to estimate a location of the object relative to the radar system based on the first delay and the second delay.

In addition to one or more of the features described herein, the processor obtains a first result as a conjugate multiplication of the first received signal and the first transmission and to obtain a second result as a conjugate multiplication of the second received signal and the second transmission.

In addition to one or more of the features described herein, the processor obtains an inter-node signal between the first node and the second node by multiplying the first result and the second result to obtain a periodic signal with a frequency that is a sum of the first delay and the second delay.

In addition to one or more of the features described herein, the periodic signal is a sinusoid.

In addition to one or more of the features described herein, the system also includes two or more additional nodes. The processor obtains the inter-node signal between every pair of the nodes in the system.

In addition to one or more of the features described herein, the processor estimates the location of the object based additionally on intra-node signals that include a first intra-node received signal received at the first receiver based on the reflection of the first transmission and a second intra-node received signal received at the second receiver based on the reflection of the second transmission.

In addition to one or more of the features described herein, the system is part of a vehicle and the estimate of the location of the object is used to augment or automate vehicle operation.

In addition to one or more of the features described herein, the first node and the second node have overlapping fields of view.

In another exemplary embodiment, a method of detecting an object with a radar system that includes a first node with a first transmitter and a first receiver and a second node with a second transmitter and a second receiver, the method comprising, and the second receiver receiving a first received signal from the object resulting from reflection a first transmission by the first transmitter, the first received signal including first phase noise, which is associated with the first transmitter, with a first delay. The method also includes the first receiver receiving a second received signal from the object resulting from reflection of a second transmission by the second transmitter, the second received signal including second phase noise, which is associated with the second transmitter, with a second delay. A location of the object is estimated relative to the radar system based on the first delay and the second delay by processing the first transmission, the first received signal, the second transmission, and the second received signal to eliminate inter-node phase noise represented by the first phase noise and the second phase noise.

In addition to one or more of the features described herein, the method also includes obtaining a first result as a conjugate multiplication of the first received signal and the first transmission and a second result as a conjugate multiplication of the second received signal and the second transmission.

In addition to one or more of the features described herein, the method also includes obtaining an inter-node signal between the first node and the second node by multiplying the first result and the second result to obtain a periodic signal with a frequency that is a sum of the first delay and the second delay.

In addition to one or more of the features described herein, obtaining the periodic signal includes obtaining a sinusoid.

In addition to one or more of the features described herein, the estimating the location of the object is based additionally on intra-node signals that include a first intra-node received signal received at the first receiver based on the reflection of the first transmission and a second intra-node received signal received at the second receiver based on the reflection of the second transmission.

In yet another exemplary embodiment, a vehicle includes a radar system including a first node including a first transmitter and a first receiver, and a second node, spaced apart from the first node, including a second transmitter and a second receiver. The second receiver receives a first received signal from an object resulting from reflection of a first transmission by the first transmitter, the first received signal including first phase noise, which is associated with the first transmitter, with a first delay, and the first receiver receives a second received signal from the object resulting from reflection of a second transmission by the second transmitter, the second received signal including second phase noise, which is associated with the second transmitter, with a second delay. The radar systems also includes a processor to address inter-node phase noise represented by the first phase noise and the second phase noise by processing the first transmission, the first received signal, the second transmission, and the second received signal to eliminate the inter-node phase noise and to estimate a location of the object relative to the radar system based on the first delay and the second delay. The vehicle also includes a vehicle controller to augment or automate vehicle operation based on the location of the object.

In addition to one or more of the features described herein, the processor obtains a first result as a conjugate multiplication of the first received signal and the first transmission and to obtain a second result as a conjugate multiplication of the second received signal and the second transmission.

In addition to one or more of the features described herein, the processor obtains an inter-node signal between the first node and the second node by multiplying the first result and the second result to obtain a periodic signal with a frequency that is a sum of the first delay and the second delay.

In addition to one or more of the features described herein, the periodic signal is a sinusoid.

In addition to one or more of the features described herein, the system also includes two or more additional nodes. The processor obtains the inter-node signal between every pair of the nodes in the system.

In addition to one or more of the features described herein, the processor estimates the location of the object based additionally on intra-node signals that include a first intra-node received signal received at the first receiver based on the reflection of the first transmission and a second intra-node received signal received at the second receiver based on the reflection of the second transmission.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
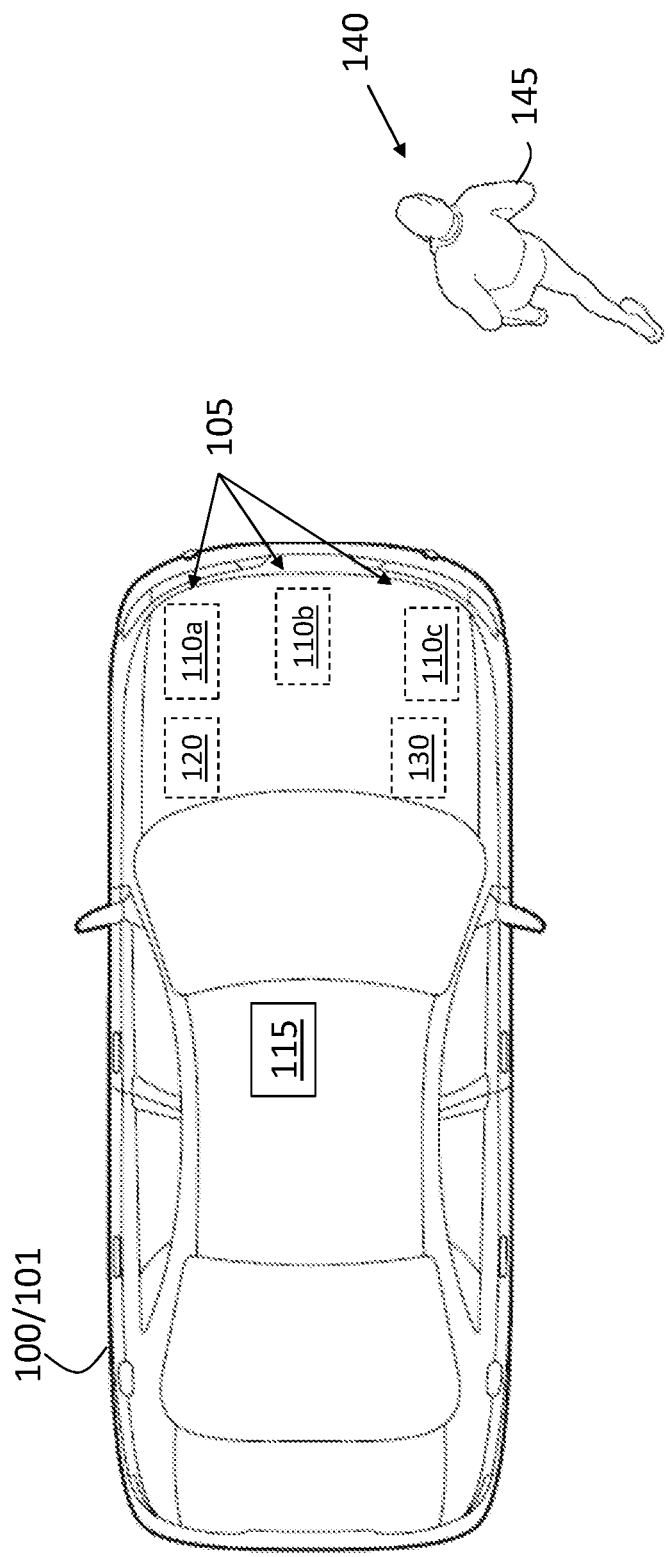
FIG. 1 is a block diagram of a scenario addressing inter-node phase noise in a radar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a radar system may be one of the sensors used to augment or automate vehicle operation. The radar system may include a number of nodes that are positioned at different locations on the vehicle. For example, a node in the front of the vehicle may be used to detect objects in the path of the vehicle to trigger a collision avoidance system while another node in the back of the vehicle may be used to detect objects or obstructions that are in the path of the vehicle when the vehicle is reversing. As another example, multiple nodes may be used in the front of the vehicle to increase the field of view over that of a single node. When the nodes have overlapping fields of view, the receiver of each node receives reflections that result from transmission by every node. Without a common reference clock, the phase noise at each of the nodes would be statistically independent from phase noise at the other nodes, which would present issues with reflections received at nodes other than the transmitting node. Yet, routing a wire between the nodes to provide a common high frequency signal gives rise to attenuation and phase noise issues. Embodiments of the systems and methods detailed herein relate to addressing inter-node phase noise in a non-coherent radar system. Non-coherent refers to the lack of phase coherence between successive pulses transmitted by the nodes.

In accordance with an exemplary embodiment, FIG. 1 is a block diagram of a scenario addressing inter-node phase noise in a radar system 105. The vehicle 100 shown in FIG. 1 is an automobile 101. The exemplary radar system 105 shown in FIG. 1 includes three nodes 110a, 110b, 110c (generally referred to as 110), further discussed with reference to FIG. 2, at the front of the automobile 101. According to alternate or additional embodiments, two or more nodes 110 may be located elsewhere on the vehicle 100. Another sensor 115 (e.g., camera, sonar, lidar system) is shown, as well. Information obtained by the radar system 105 and one or more other sensors 115 may be provided to a controller 120 (e.g., electronic control unit (ECU)) for image or data processing, target recognition, and subsequent vehicle control.

The controller 120 may use the information to control one or more vehicle systems 130. In an exemplary embodiment, the vehicle 100 may be an autonomous vehicle and the controller 120 may perform known vehicle operational control using information from the radar system 105 and other sources. In alternate embodiments, the controller 120 may augment vehicle operation using information from the radar system 105 and other sources as part of a known system (e.g., collision avoidance system, adaptive cruise control system). The radar system 105 and one or more other sensors 115 may be used to detect objects 140, such as the pedestrian 145 shown in FIG. 1. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The radar system 105 may provide data to the controller 120 for processing. According to alternate embodiments, the radar system 105 includes processing circuitry, similar to that described for the controller 120, to process data (e.g., reflections obtained at the receivers of each of the nodes 110).

Figure 2:
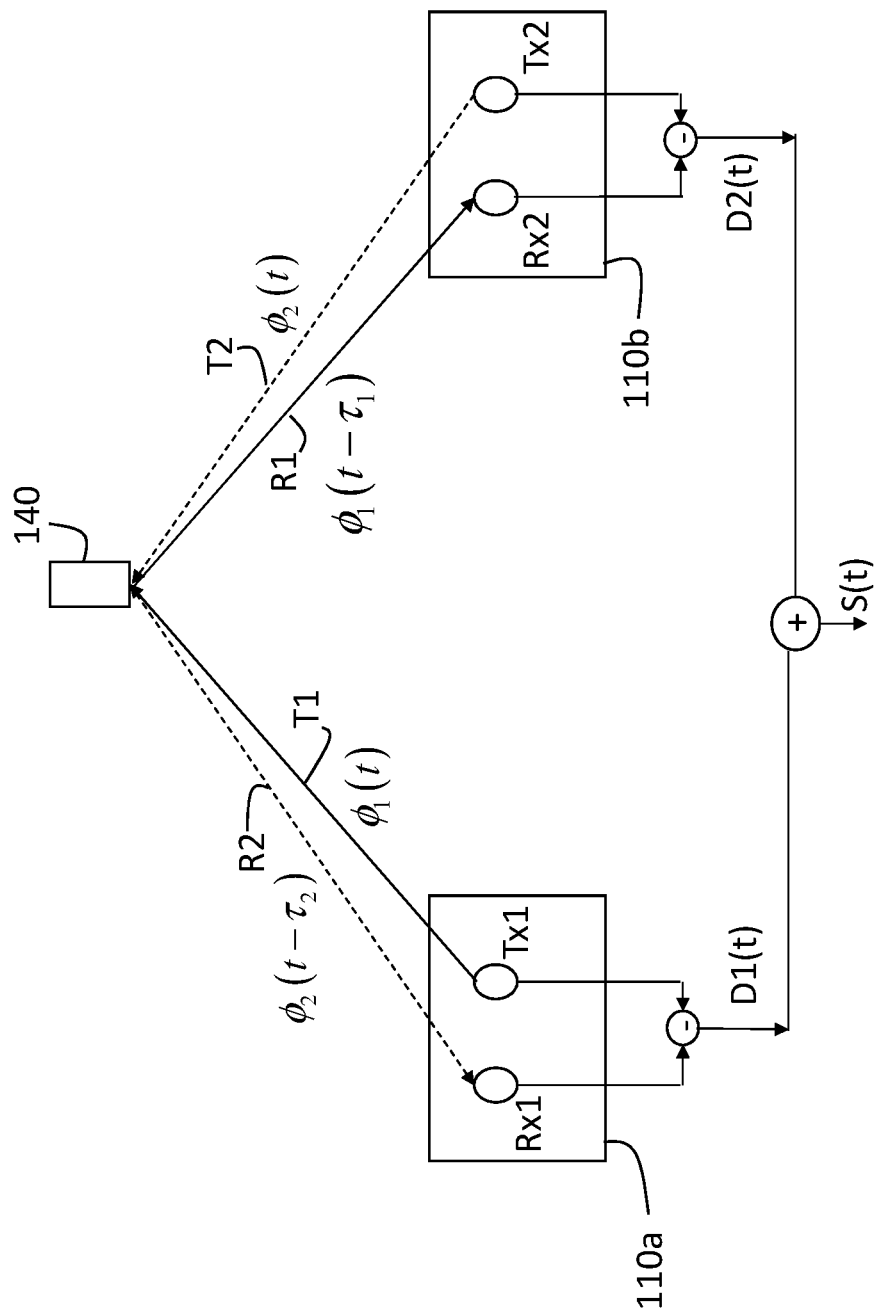
FIG. 2 shows two nodes of the radar system that are processed to address inter-node phase noise according to one or more embodiments.

FIG. 2 shows two nodes 110a, 110b of the radar system 105 that are processed to address inter-node phase noise according to one or more embodiments. As indicated, the transmitters Tx1, Tx2 respectively associated with each of the nodes 110a, 110b emit transmissions T1, T2 to a reflection point (i.e., an object 140). In FIG. 2, reflection R1 of the transmission by Tx1 to Rx2 is shown as the solid line, and reflection R2 of the transmission by Tx2 to Rx1 is shown as the dashed line. For simplicity, the reflection of the transmission T1 from Tx1 to Rx1 and the reflection of the transmission T2 from Tx2 to Rx2 are not shown, because these intra-node reflections are not subject to the inter-node phase noise discussed herein. As previously noted, each node 110 has an associated, independent phase noise. Thus, for purposes of phase noise consideration, transmitter and receiver pairs of the same node 110 may be ignored. That is, for example, the difference in phase noise between the transmission T1 by Tx1 and the resulting reflection received by Rx1 would be negligible. The discussion herein pertains to addressing inter-node phase noise (e.g., the difference $D1(t)$ in phase noise between a transmission T1 by the transmitter Tx1 and the reflection R2 received by Rx1 based on a transmission T2 by transmitter Tx2).

As indicated in FIG. 2, the phase noise associated with the transmission T1 by Tx1 is $\phi_1(t)$ and the phase noise associated with the transmission T2 by Tx2 is $\phi_2(t)$. At receiver Rx2, the reflection R1 resulting from transmission T1 by transmitter Tx1 has a phase noise of $\phi_1(t-\tau_1)$, and, at receiver Rx1, the reflection R2 resulting from transmission T2 by transmitter Tx2 has a phase noise of $\phi_2(t-\tau_2)$. The difference in phase noises between reflection R2 and transmission T1 at node 110a is $D1(t)$, as indicated, and is given by:

$$D1(t)=\varnothing_2(t-\tau_2)-\varnothing_1(t) \quad [\text{EQ. 1}]$$

The difference in phase noises between reflection R1 and transmission T2 at node 110b is $D2(t)$, as indicated, and is given by:

$$D2(t)=\varnothing_1(t-\tau_1)-\varnothing_2(t) \quad [\text{EQ. 2}]$$

The delay values $\tau_1$ and $\tau_2$ are related to the position of the object 140 that resulted in the reflections R1, R2. Thus, these delays $\tau_1$ and $\tau_2$ are of interest in obtaining information about the object 140. However, because the phase noise associated with each node 110 is statistically independent (i.e., $\phi_1$, $\phi_2$ are statistically independent), $D1(t)$ and $D2(t)$ are not negligible and must be addressed in order to determine the delays $\tau_1$ and $\tau_2$.

The sum $S(t)$ of $D1(t)$ and $D2(t)$ is indicated in FIG. 2. The sum $S(t)$ is given by:

$$S(t)=\varnothing_2(t-\tau_2)-\varnothing_1(t)+\varnothing_1(t-\tau_1)-\varnothing_2(t) \quad [\text{EQ. 3}]$$

However, as previously noted, $\phi_1(t) \approx \phi_1(t-\tau_1)$, and $\phi_2(t) \approx \phi_2(t-\tau_2)$. Thus, EQ. 3 may be rewritten for explanatory purposes as:

$$S(t)=\varnothing_2(t-\tau_2)-\varnothing_2(t)+\varnothing_1(t-\tau_1)-\varnothing_1(t) \quad [\text{EQ. 4}]$$

EQ. 4 makes it clear that $S(t)$ is approximately 0. This relationship is used to process the transmissions T1, T2 and reflections R1, R2 to cancel out inter-node phase noise and obtain the expression needed to determine delays $\tau_1$ and $\tau_2$, as detailed with reference to FIG. 3

Figure 3:
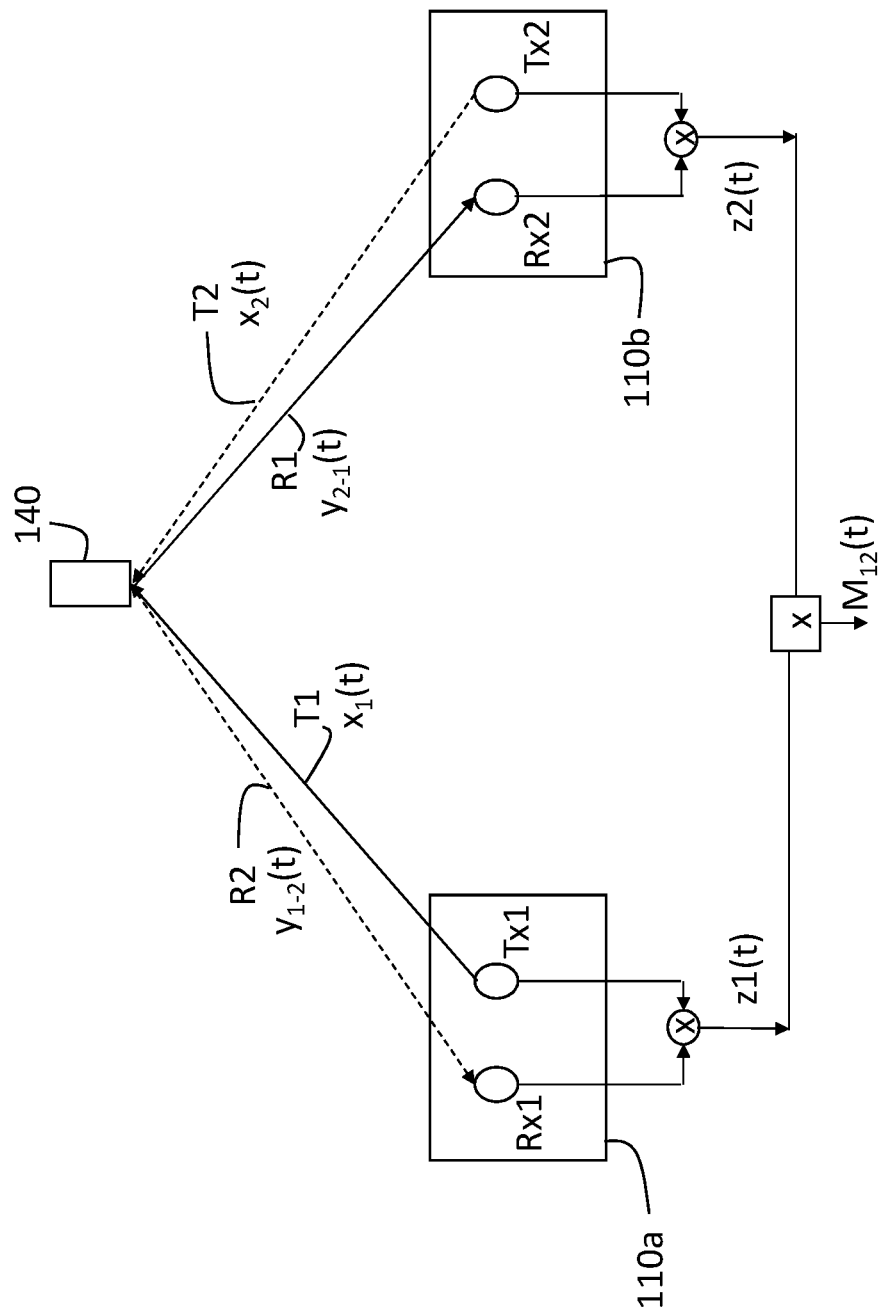
FIG. 3 indicates processing performed to address inter-node phase noise of two nodes of a radar system according to one or more embodiments.

FIG. 3 indicates processing performed to address inter-node phase noise of two nodes 110a, 110b of a radar system 105 according to one or more embodiments. As FIG. 3 indicates, the transmission T1 by the transmitter Tx1 may be represented as:

$$x_1(t)=e^{j(2\pi ft+\alpha t^2+\varnothing_1(t))} \quad [\text{EQ. 5}]$$

The transmissions T1, T2 are assumed to be linear frequency modulated continuous wave signals, referred to as chips. Thus, in EQ. 5, f is the frequency, which changes (increases or decreases) linearly as a function of time, and $\alpha$ is the chirp slope, which indicates the rate of change of frequency with time. The transmission T2 by the transmitter Tx2 may be represented as:

$$x_2(t)=e^{j(2\pi ft+\alpha t^2+\varnothing_2(t))} \quad [\text{EQ. 6}]$$

The reflection R2 that is received by the receiver Rx1 based on the transmission T2 may be represented as:

$$y_{1-2}(t)=x_2(t-\tau_2)=e^{j(2\pi f(t-\tau_2)+\alpha(t-\tau_2)^2+\varnothing_2(t-\tau_2))} \quad [\text{EQ. 7}]$$

The label $y_{1-2}$ indicates inter-node reception by receiver Rx1 based on transmission T2 by transmitter Tx2. To be clear, the receiver Rx1 also receives an intra-node reflection, represented by $y_{1-1}$, based on transmission T1 by transmitter Tx1. The reflection R1 that is received by the receiver Rx2 based on the transmission T1 may be represented as:

$$y_{2-1}(t)=x_1(t-\tau_1)=e^{j(2\pi f(t-\tau_1)+\alpha(t-\tau_1)^2+\varnothing_1(t-\tau_1))} \quad [\text{EQ. 8}]$$

Again, it bears noting that receiver Rx2 also receives an intra-node reflection, represented by $y_{2-2}$, based on transmission T2 by transmitter Tx2.

Based on the determination, discussed with reference to EQ. 4, that the sum $S(t)$ of the differences $D1(t)$, $D2(t)$ of inter-node phase noise is approximately 0, the transmissions T1, T2 and reflections R1, R2 are processed to cancel out inter-node phase noise. Specifically, conjugate multiplication is performed to subtract inter-node phase noise at each node 110. This is followed by multiplication of the conjugate multiplication result at each node 110, which results in an addition of the phase noises. Thus, the conjugate multiplication at node 110a results in:

$$z1(t)=y_2(t)x^*_{1-2}(t)=e^{j(-2\pi f\tau_2-2\alpha\tau_2 t+\varnothing_2(t-\tau_2)-\varnothing_1(t))} \quad [\text{EQ. 9}]$$

In EQ. 9, there is also a $\alpha\tau_2^2$ term, but this term is negligibly small and may be left out. The conjugate multiplication at node 110b results in:

$$z2(t)=y_1(t)x^*_{2-1}(t)=e^{j(-2\pi f\tau_1-2\alpha\tau_1 t+\varnothing_1(t-\tau_1)-\varnothing_2(t))} \quad [\text{EQ. 10}]$$

In EQ. 10, the $\alpha\tau_1^2$ term is deemed negligible and left out. As EQ. 9 and EQ. 10 indicate, z1(t) and z2(t) respectively include phase noise components $D1(t)$ and $D2(t)$. The multiplication of z1(t) and z2(t) results in an addition of the phase noise components $D1(t)$ and $D2(t)$. Specifically:

$$M_{12}(t)=e^{j(-2\pi f(\tau_1+\tau_2)-2\alpha(\tau_1+\tau_2)t+\varnothing_2(t-\tau_2)-\varnothing_1(t)+\varnothing_1(t-\tau_1)-\varnothing_2(t))} \quad [\text{EQ. 11}]$$

Rewriting EQ. 11 using EQS. 1 and 2 gives:

$$M_{12}(t)=e^{j(-2\pi f(\tau_1+\tau_2)-2\alpha(\tau_1+\tau_2)t+D1(t)+D2(t))} \quad [\text{EQ. 12}]$$

Based on EQ. 4, $S(t)=D1(t)+D2(t)$ is approximately 0. Thus, EQ. 11 may be simplified as:

$$M_{12}(t)=e^{j(-2\pi f(\tau_1+\tau_2)-2\alpha(\tau_1+\tau_2)t)} \quad [\text{EQ. 13}]$$

The resulting desired signal $M_{12}(t)$ is a sinusoid with a frequency proportional to $(\tau_1+\tau_2)$.

Figure 4:
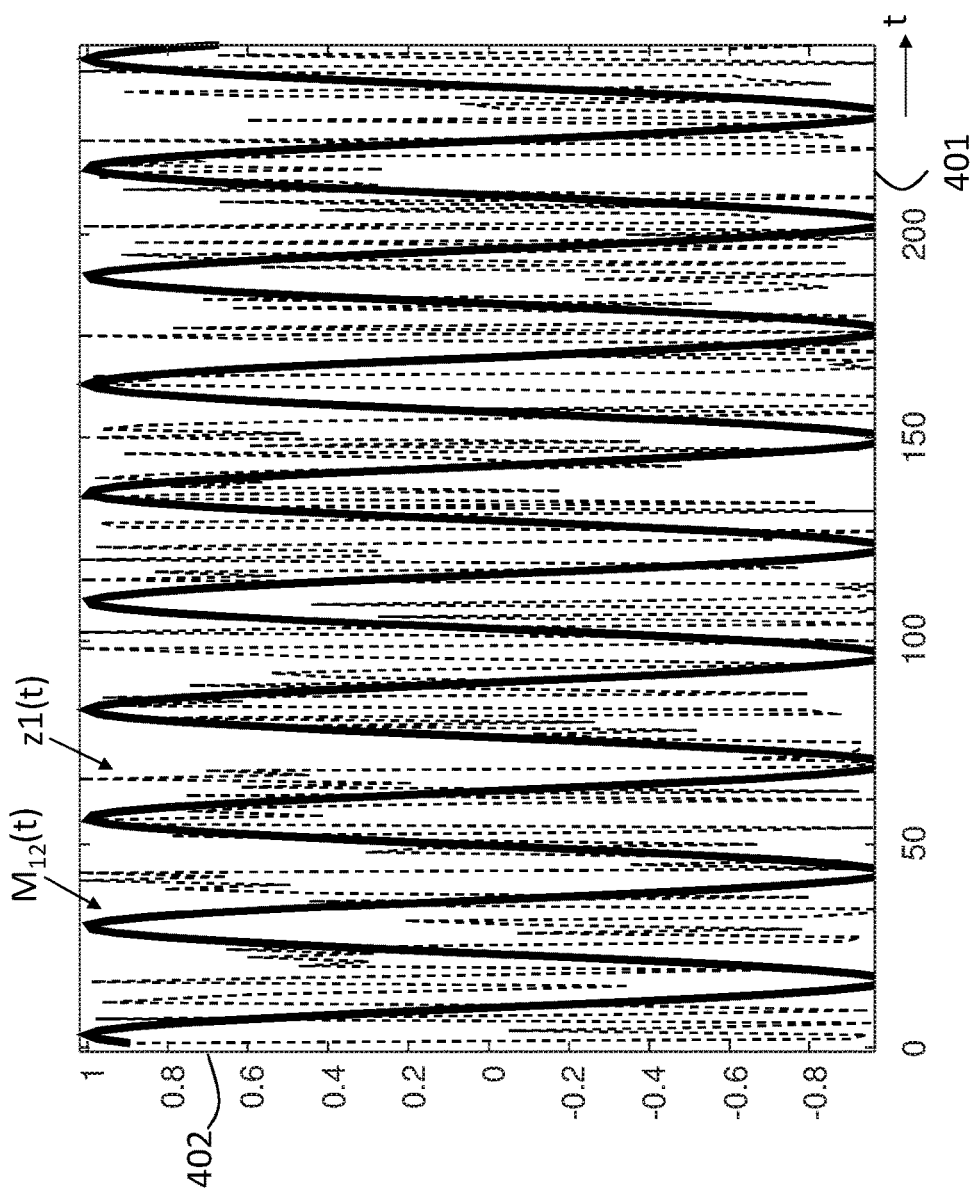
FIG. 4 illustrates an exemplary result of addressing inter-node phase noise according to one or more embodiments.

FIG. 4 illustrates an exemplary result of addressing inter-node phase noise according to one or more embodiments. $M_{12}(t)$ is shown along with z1(t). Time t is shown along one axis 401, and amplitude around 0 is shown on the perpendicular axis 402. As previously noted, $M_{12}(t)$ is a sinusoid, and the frequency is proportional to $(\tau_1+\tau_2)$. The values of $\tau_1$ and $\tau_2$ are both of interest because they relate to the position of the object 140. As FIG. 4 indicates, the phase noise component of z1(t) makes it difficult to discern any useful information from the signal. While a sinusoid is specifically discussed for explanatory purposes, the result of addressing inter-node phase noise according to one or more alternate embodiments may be another periodic signal. Generally, $$e^{j2\pi ft}=\cos(2\pi ft)+j\sin(2\pi ft) \quad [\text{EQ. 14}]$$

Thus, $M_{12}(t)$ need not be represented only as a sinusoid.

Figure 5:
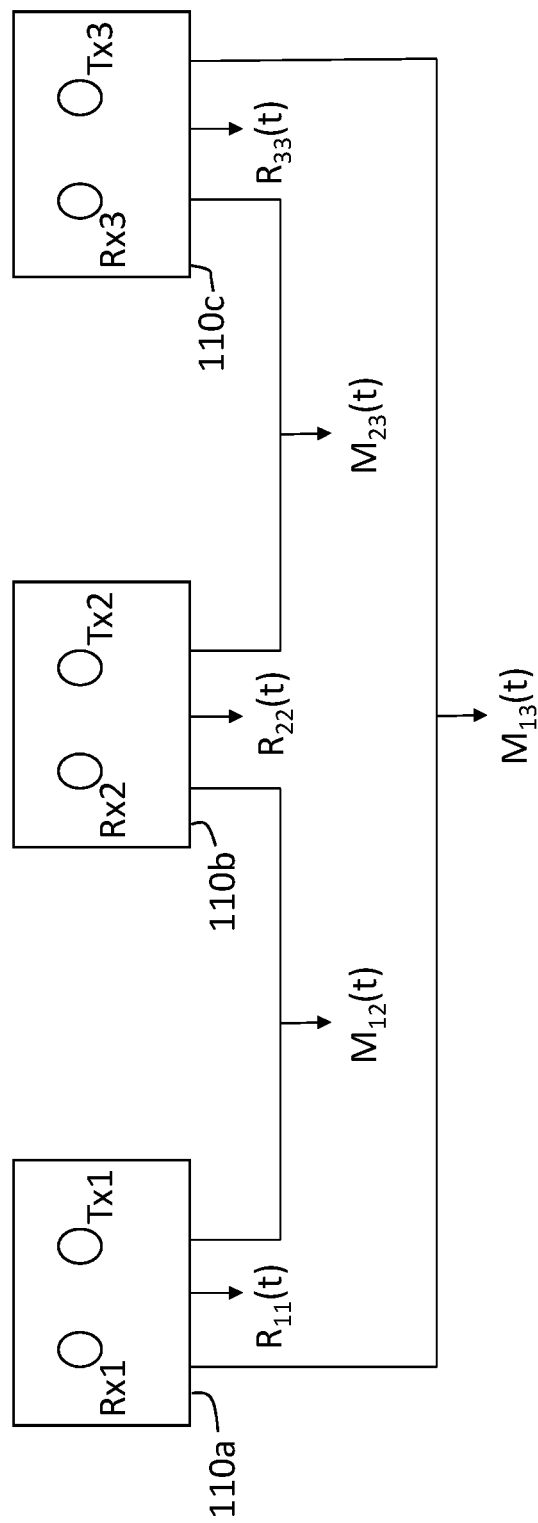
FIG. 5 shows three exemplary nodes of a radar system used for object detection and monitoring based on addressing inter-node phase noise according to one or more embodiments.

FIG. 5 shows three exemplary nodes 110a, 110b, 110c of a radar system 105 used for object detection and monitoring based on addressing inter-node phase noise according to one or more embodiments. As FIG. 5 indicates, six results may be obtained from the three nodes 110 in order to determine information about an object 140 that reflected transmissions from the transmitters Tx1, Tx2, Tx3. As detailed with reference to FIG. 3, $M_{12}(t)$ is obtained as a sinusoid with a frequency proportional to $(\tau_1+\tau_2)$. Similarly, $M_{13}(t)$ may be obtained as a sinusoid with a frequency proportional to $(\tau_1+\tau_3)$, and $M_{23}(t)$ may be obtained as a sinusoid with a frequency proportional to $(\tau_2+\tau_3)$. All three delays $\tau_1$, $\tau_2$, and $\tau_3$ may be used to increase the accuracy of estimating the position of the object 140 that resulted in the received signals at receivers Rx1, Rx2, and Rx3.

Additionally, intra-node results $R_{11}(t)$, $R_{22}(t)$, and $R_{33}(t)$ may also be obtained. The determination of $R_{11}(t)$ is detailed for explanatory purposes. $R_{11}(t)$ results from transmission by the transmitter Tx1 and reception of the resulting reflection by the receiver Rx1 of the same node 110a. The transmission by Tx1 may be represented at EQ. 5 by $x_1(t)$. The reflection received by receiver Rx1 may be represented as:

$$y_{1-1}(t)=x_1(t-\tau_1)=e^{j(2\pi f(t-\tau_1)+\alpha(t-\tau_1)^2+\varnothing 2(t-\tau_1))} \quad [\text{EQ. 15}]$$

The intra-node result $R_{11}(t)$ is obtained from conjugate multiplication of $x_1(t)$ and $y_{1-1}(t)$ as:

$$R_{11}(t)=e^{j(-2\pi f\tau_1-2\alpha\tau_1 t+\alpha\tau^2+\varnothing 1(t-\tau_1)-\varnothing 1(t))} \quad [\text{EQ. 16}]$$

As previously noted, $\phi_1(t)\varnothing\phi_1(t-\tau_1)$, and $\alpha\tau_1^2$ is negligible. Thus, $R_{11}(t)$ may be rewritten as:

$$R_{11}(t)=e^{j(-2\pi f\tau_1-2\alpha\tau_1 t)} \quad [\text{EQ. 17}]$$

That is, $R_{11}(t)$ is a sinusoid with a frequency $\tau_1$. Similarly, $R_{22}(t)$ is a sinusoid with a frequency $\tau_2$, and $R_{33}(t)$ is a sinusoid with a frequency $\tau_3$. Based on the inter-node phase elimination, according to the embodiments detailed herein, not only $R_{11}(t)$, $R_{22}(t)$, and $R_{33}(t)$ but also $M_{12}(t)$, $M_{13}(t)$, and $M_{23}(t)$ may be used to estimate the location of object 140. It should be clear that any number of nodes 110 may be part of the radar system 105. Any number of nodes 110 that share a field of view and, thus, have inter-node reflections may be processed according to the embodiments detailed herein to address inter-node phase noise.

As previously noted, the delay values that are obtained by addressing inter-node phase noise are of interest because they indicate the position of the object 140. For example, once $M_{12}(t)$ is obtained, a mapping may be used to match $\tau_1+\tau_2$ with a position of the object 140. However, there may be multiple possible positions of the object 140 that match with a given $\tau_1+\tau_2$. Thus, having multiple combinations (e.g., $R_{11}(t)$, $R_{22}(t)$, $R_{33}(t)$, $M_{12}(t)$, $M_{13}(t)$, and $M_{23}(t)$) facilitates a more accurate determination of the position of the object 140 and facilitates developing a deterministic relationship between, for example, $\tau_1+\tau_2$ and the position of the object 140.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A radar system, comprising:
a first node including a first transmitter and a first receiver;
a second node, spaced apart from the first node, including a second transmitter and a second receiver, wherein the second receiver receives a first received signal from an object resulting from reflection of a first transmission by the first transmitter, the first received signal including first phase noise, which is associated with the first transmitter, with a first delay, and the first receiver receives a second received signal from the object resulting from reflection of a second transmission by the second transmitter, the second received signal including second phase noise, which is associated with the second transmitter, with a second delay; and
a processor configured to address inter-node phase noise represented by the first phase noise and the second phase noise by processing the first transmission, the first received signal, the second transmission, and the second received signal to eliminate the inter-node phase noise and to estimate a location of the object relative to the radar system based on the first delay and the second delay.

2. The system according to claim 1, wherein the processor is further configured to obtain a first result as a conjugate multiplication of the first received signal and the first transmission and to obtain a second result as a conjugate multiplication of the second received signal and the second transmission.

3. The system according to claim 2, wherein the processor is further configured to obtain an inter-node signal between the first node and the second node by multiplying the first result and the second result to obtain a periodic signal with a frequency that is a sum of the first delay and the second delay.

4. The system according to claim 3, wherein the periodic signal is a sinusoid.

5. The system according to claim 3, further comprising two or more additional nodes, wherein the processor is further configured to obtain the inter-node signal between every pair of the nodes in the system.

6. The system according to claim 1, wherein the processor estimates the location of the object based additionally on intra-node signals that include a first intra-node received signal received at the first receiver based on the reflection of the first transmission and a second intra-node received signal received at the second receiver based on the reflection of the second transmission.

7. The system according to claim 1, wherein the system is part of a vehicle and the estimate of the location of the object is used to augment or automate vehicle operation.

8. The system according to claim 7, wherein the first node and the second node have overlapping fields of view.

9. A method of detecting an object with a radar system that includes a first node with a first transmitter and a first receiver and a second node with a second transmitter and a second receiver, the method comprising:
the second receiver receiving a first received signal from the object resulting from reflection a first transmission by the first transmitter, the first received signal including first phase noise, which is associated with the first transmitter, with a first delay;

the first receiver receiving a second received signal from the object resulting from reflection of a second transmission by the second transmitter, the second received signal including second phase noise, which is associated with the second transmitter, with a second delay; and estimating, using a processor, a location of the object relative to the radar system based on the first delay and the second delay by processing the first transmission, the first received signal, the second transmission, and the second received signal to eliminate inter-node phase noise represented by the first phase noise and the second phase noise.

10. The method according to claim 9, further comprising obtaining a first result as a conjugate multiplication of the first received signal and the first transmission and a second result as a conjugate multiplication of the second received signal and the second transmission.

11. The method according to claim 10, further comprising obtaining an inter-node signal between the first node and the second node by multiplying the first result and the second result to obtain a periodic signal with a frequency that is a sum of the first delay and the second delay.

12. The method according to claim 11, wherein obtaining the periodic signal includes obtaining a sinusoid.

13. The method according to claim 9, wherein the estimating the location of the object is based additionally on intra-node signals that include a first intra-node received signal received at the first receiver based on the reflection of the first transmission and a second intra-node received signal received at the second receiver based on the reflection of the second transmission.

14. A vehicle, comprising:
radar system, comprising:
a first node including a first transmitter and a first receiver;
a second node, spaced apart from the first node, including a second transmitter and a second receiver, wherein the second receiver receives a first received signal from an object resulting from reflection of a first transmission by the first transmitter, the first received signal including first phase noise, which is associated with the first transmitter, with a first delay, and the first receiver receives a second received signal from the object resulting from reflection of a second transmission by the second transmitter, the second received signal including second phase noise, which is associated with the second transmitter, with a second delay; and a processor configured to address inter-node phase noise represented by the first phase noise and the second phase noise by processing the first transmission, the first received signal, the second transmission, and the second received signal to eliminate the inter-node phase noise and to estimate a location of the object relative to the radar system based on the first delay and the second delay; and a vehicle controller configured to augment or automate vehicle operation based on the location of the object.

15. The vehicle according to claim 14, wherein the processor is further configured to obtain a first result as a conjugate multiplication of the first received signal and the first transmission and to obtain a second result as a conjugate multiplication of the second received signal and the second transmission.

16. The vehicle according to claim 15, wherein the processor is further configured to obtain an inter-node signal between the first node and the second node by multiplying the first result and the second result to obtain a periodic signal with a frequency that is a sum of the first delay and the second delay.

17. The vehicle according to claim 16, wherein the periodic signal is a sinusoid.

18. The vehicle according to claim 16, further comprising two or more additional nodes, wherein the processor is further configured to obtain the inter-node signal between every pair of the nodes in the system.

19. The vehicle according to claim 14, wherein the processor estimates the location of the object based additionally on intra-node signals that include a first intra-node received signal received at the first receiver based on the reflection of the first transmission and a second intra-node received signal received at the second receiver based on the reflection of the second transmission.

* * * * *